United States Patent

Bae

(10) Patent No.: US 6,195,133 B1
(45) Date of Patent: Feb. 27, 2001

(54) DIGITAL AUTOMATIC GAIN CONTROL (AGC) CIRCUIT

(75) Inventor: Jum-han Bae, Suwon (KR)

(73) Assignee: Samsung Elctronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/008,061

(22) Filed: Jan. 16, 1998

(30) Foreign Application Priority Data

Jan. 17, 1997 (KR) ...................................... 97-1310

(51) Int. Cl.⁷ ...................................... H04N 5/52
(52) U.S. Cl. .......................... 348/678; 348/572
(58) Field of Search .................... 348/525, 526, 348/528, 530, 572, 678, 680, 681, 682, 683, 684, 685, 691, 695, 696, 697; 330/141, 254; 378/98.7; H04N 5/52

(56) References Cited

U.S. PATENT DOCUMENTS

| | | | |
|---|---|---|---|
| 4,511,920 | * 4/1985 | Iijima et al. | 348/194 |
| 4,680,633 | * 7/1987 | Gerdes et al. | 348/526 |
| 4,837,625 | * 6/1989 | Douziech et al. | 348/678 |
| 4,970,594 | * 11/1990 | Kitaura et al. | 348/697 |
| 4,989,074 | * 1/1991 | Matsumoto | 348/572 |
| 4,998,106 | * 3/1991 | Koga et al. | 341/139 |
| 5,341,173 | * 8/1994 | Hyeon | 348/525 |
| 5,352,988 | * 10/1994 | Park | 330/141 |
| 5,379,075 | * 1/1995 | Nagasawa et al. | 348/678 |
| 5,544,214 | * 8/1996 | Van Der Laar | 378/98.7 |
| 5,668,501 | * 9/1997 | Venes | 330/254 |
| 5,737,033 | * 4/1998 | Masuda | 348/678 |
| 5,953,069 | * 9/1999 | Bruins et al. | 348/525 |

FOREIGN PATENT DOCUMENTS

| | | | |
|---|---|---|---|
| 48-54859 | 8/1973 | (JP) | . |
| 58-15376 | 1/1983 | (JP) | H04N/5/52 |
| 60-75112 | 4/1985 | (JP) | H03G/3/20 |
| 3-268588 | 11/1991 | (JP) | H04N/5/52 |
| 4-20178 | 1/1992 | (JP) | H04N/5/14 |
| 5-64102 | 3/1993 | (JP) | H04N/5/52 |
| 5-219406 | 8/1993 | (JP) | H04N/5/14 |
| 7-99618 | 4/1995 | (JP) | H04N/5/57 |

* cited by examiner

Primary Examiner—Sherrie Hsia
(74) Attorney, Agent, or Firm—Sughrue, Mion, Zinn, Macpeak & Seas, PLLC

(57) ABSTRACT

A digital AGC circuit is provided which includes an A/D converter, an AGC gate pulse generator and a TOP voltage controller. The A/D converter converts a video signal clamped to a reference level into digital data having a voltage between a predetermined reference voltage and a TOP voltage. The AGC gate pulse generator generates an AGC gate pulse for detecting a pedestal level region of the video signal, according to vertical and horizontal synchronous signals. The TOP voltage controller controls the TOP voltage of the A/D converter on the basis of a sample value extracted from the output of the A/D converter and a sync tip value of a standard signal, while the AGC gate pulse generated by the AGC gate pulse generator is enabled. All circuits but the low pass filter are digital circuits, so a special analog AGC IC is not needed. AGC is performed by controlling the TOP voltage of the A/D converter, thereby accomplishing an accurate AGC.

8 Claims, 4 Drawing Sheets

DIGITAL AUTOMATIC GAIN CONTROL (AGC) CIRCUIT

BACKGROUND OF THE INVENTION

1. Field of the Invention

The present invention relates to an automatic gain control (AGC) circuit, and more particularly, to a digital AGC circuit which performs AGC by controlling a TOP voltage of an A/D converter.

2. Description of Related Art

An AGC circuit automatically controls a gain to give a constant output value at any time despite changes in input value. A conventional AGC circuit is made using an analog device. While, the conventional analog AGC circuit has no specific problem when used in an analog system, it is inconvenient to use in a digital system. Further, an AGC circuit which can perform a more accurate automatic gain control is needed. Meanwhile, an accurate AGC circuit, using mostly digital circuits, has been disclosed in a Korean patent No. 95-10063.

SUMMARY OF THE INVENTION

The present invention provides a digital automatic gain control (AGC) circuit in which all circuits except for a low pass filter are digital circuits, and which performs an accurate AGC by controlling a TOP voltage of an A/D converter.

The digital AGC circuit of the present invention comprises an A/D converter, an AGC gate pulse generator and a TOP voltage controller. The A/D converter converts a video signal clamped to a reference level into digital data having a voltage between a predetermined reference voltage and a TOP voltage. The AGC gate pulse generator generates an AGC gate pulse for detecting a pedestal level region of the video signal, according to vertical and horizontal synchronous signals. The TOP voltage controller controls the TOP voltage of the A/D converter on the basis of a sample value extracted from the output of the A/D converter and a sync tip value of a standard signal, while the AGC gate pulse generated by the AGC gate pulse generator is enabled.

The TOP voltage controller comprises an AGC comparator, a PWM pulse generator and a low pass filter. The AGC comparator compares a mean value (M) of a predetermined number of samples extracted from the digital data output by the A/D converter with the sync tip value (K) of the standard signal, while the AGC gate pulse is enabled. The pulse width modulation (PWM) pulse generator generates a PWM pulse signal corresponding to the output of the AGC comparator. The low pass filter integrates the PWM pulse signal output by the PWM pulse generator and transforms the result into a direct current voltage to be used as the TOP voltage of the A/D converter.

The AGC comparator comprises a sample mean value unit, a 1/K value setting unit and a multiplier. The sample mean value unit calculates the mean value (M) of N samples extracted from the output of the A/D converter, while the AGC gate pulse is enabled. The 1/K value setting unit obtains a sync tip value (K) of a standard signal and outputs the reciprocal value (1/K) of the sync tip value (K). The multiplier multiplies the mean value (M) output by the sample mean value unit by the value (1/K) set by the 1/K value setting unit and outputs the product (M/K) to the PWM pulse generator.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 1:
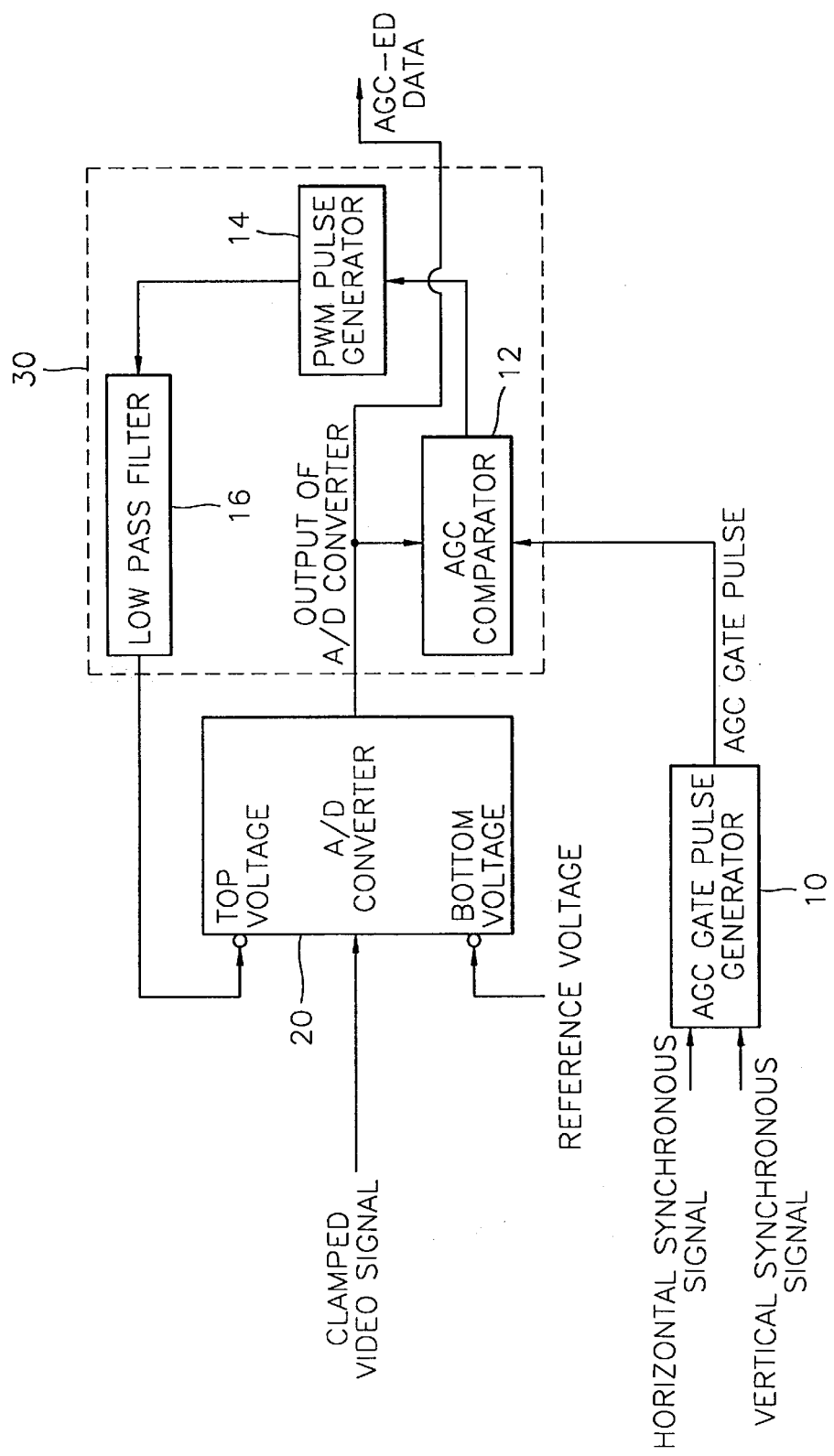
FIG. 1 is a block diagram of a digital AGC circuit according to an embodiment of the present invention.
Figure 2:
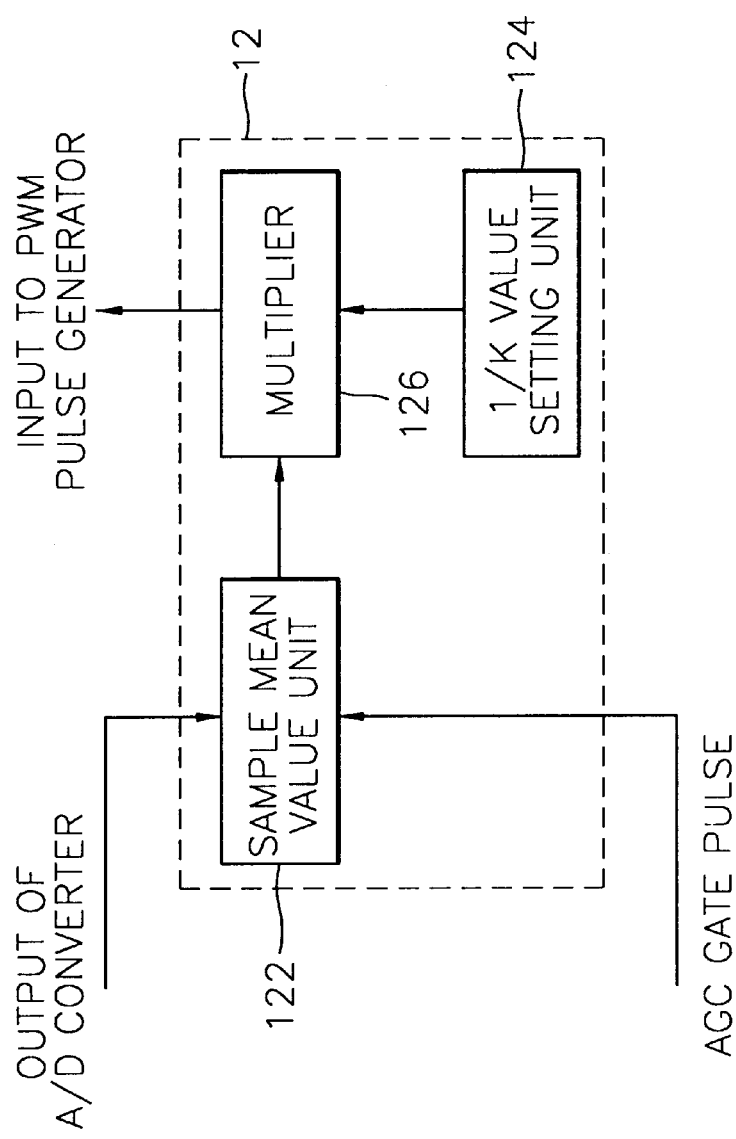
FIG. 2 is a detailed block diagram of an AGC comparator shown in FIG. 1.

Referring to FIGS. 1 and 2, a digital AGC circuit according to an embodiment of the present invention includes an AGC gate pulse generator 10, an A/D converter 20 and a TOP voltage controller 30. The TOP voltage controller 30 includes an AGC comparator 12, a PWM pulse generator 14 and a low pass filter 16. As shown in FIG. 2, the AGC comparator 12 includes a sample mean value unit 122, a 1/K value setting unit 124 and a multiplier 126.

Figure 3:
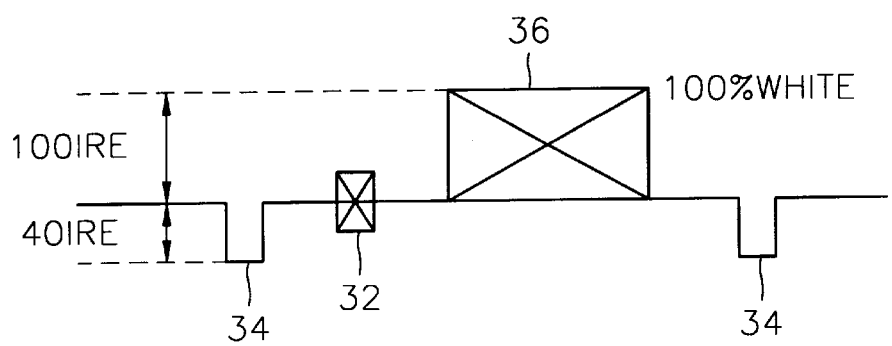
FIG. 3 is a waveform illustrating a process for obtaining a sync tip value (K) with respect to a standard signal.
Figure 5:
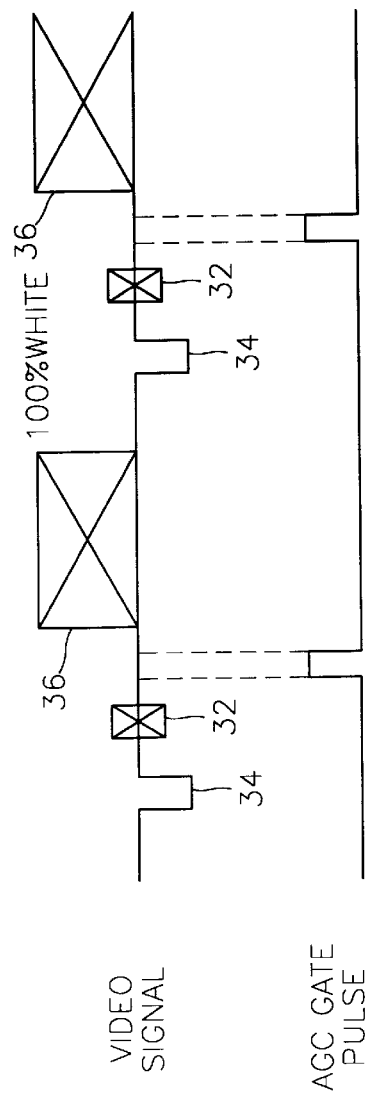
FIG. 5 is a waveform of a video signal and an AGC gate pulse.
Figure 6:
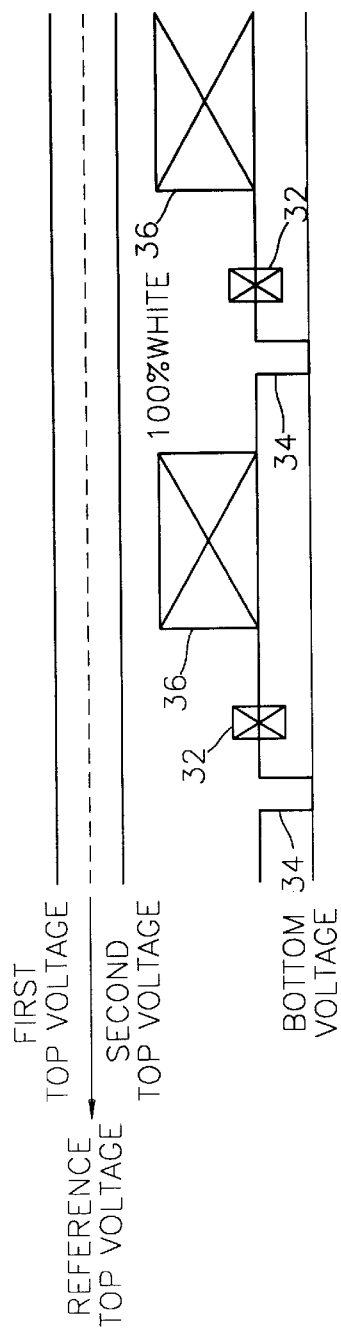
FIG. 6 is a waveform for illustrating a relationship between a multiplier output value (M/K) and an A/D converter TOP value.

The AGC gate pulse generator 10 receives horizontal and vertical synchronous signals and generates an AGC gate pulse for detecting a pedestal level region of a video signal clamped to a reference level. Here, the vertical synchronous signal is necessary to generate an AGC gate pulse to prevent the AGC gate pulse from being enabled within a vertical synchronization signal. The AGC gate pulse (shown in FIG. 5) can be generated in plural. The A/D converter 20 performs an A/D conversion on the video signal clamped to a reference level between a reference voltage (usually, a ground voltage) and an initially-set TOP voltage (hereinbelow, called a reference TOP voltage). The AGC comparator 12 compares a mean value (M) with a sync tip value (K) with respect to a standard video signal. A standard video signal (hereinbelow, called a standard signal) represents a distance between a sync tip and a white peak (100% white) as 140 IRE, and is comprised of a video signal (100 IRE), a sync signal (40 IRE), and a color burst signal (40 IRE) as the basis of a color signal, with reference to a sync pedestal level (0 IRE). This is shown in FIG. 3. In FIGS. 3, 5 and 6, reference numerals 32, 34 and 36 denote a color burst signal, a sync tip, and a video signal, respectively. The mean value (M) is the mean of N samples extracted from digital data (data in a pedestal region of a video signal) output by the A/D converter 20, while the AGC gate pulse is enabled. Here, the sync tip value (K) of the standard signal denotes a value between a sync tip and a pedestal level of the standard signal, i.e., a pedestal value of the standard signal.

The operation of the AGC comparator 12 will now be described in detail with reference to FIG. 2. The sample mean value unit 122 calculates the mean value (M) of N samples extracted from the output of the A/D converter 20 while the AGC gate pulse is enabled.

At this time, the N samples which are used to calculate the mean value (M) may be obtained in either of two ways. Using the first method, the N samples are all extracted from the output of the A/D converter 20 while one AGC gate pulse is enabled. Using the second method, only one sample is extracted during each AGC gate pulse, so that the N samples are gathered over the period of N AGC gate pulses. The sample mean value unit 122 can be easily realized using an M-bit shift register, an adder or a multiplier. The 1/K value setting unit 124 obtains a sync tip value (K) with respect to a standard signal and outputs the reciprocal (1/K) of the sync tip value (K). The multiplier 126 multiplies the mean value (M), output by the sample mean value unit 122, by the value (1/K) set by the 1/K value setting value 124, and outputs the multiplied value (M/K) to the PWM pulse generator 14. The AGC comparator 12 shown in FIG. 2 can also be comprised of a sample mean value unit 122 and a comparator (not shown). In that case, the comparator (not shown) outputs the difference between the mean value (M), output by the sample mean value unit 122, and the sync tip value (K) of the standard signal. The cases when the output of the comparator (not shown) is negative or positive correspond to the cases when the output value (M/K) (to be described later) of the multiplier 126 is smaller or larger than 1. When the output of the comparator is 0, M/K is 1.

The method of obtaining a sync tip value (K) with respect to a standard signal will now be described referring to FIG. 3. For an example, an 8-bit analog-to-digital conversion of an NTSC signal will be used. In this case, the sync tip value (K) of the standard signal becomes 72.85 by calculating a proportional expression, i.e., 255:140 IRE=K:40 IRE. In this example, the value K is set as 72 to simplify calculation. When an n-bit analog-to-digital conversion is performed, the sync tip value (K) with respect to the standard signal is given as $(40\ \text{IRE}/140\ \text{IRE})*(2^n-1)$. In the PAL or SECAM systems, K is given as $(42\ \text{IRE}/137\ \text{IRE})*(2^n-1)$.

The multiplier 126 multiplies the mean value (M), output by the sample mean value unit 122, by the value (1/K) set by the 1/K value setting unit 124, and outputs the product (M/K) to the PWM pulse generator 14. The PWM pulse generator 14 generates a PWM pulse signal corresponding to the output of the AGC comparator 12. The low pass filter 16 then integrates the PWM pulse signal output by the PWM pulse generator 14, and transforms the result into a direct current voltage to be used as a TOP voltage of the A/D converter 20.

Figure 4A:
FIGS. 4A and 4B are waveforms illustrating a relationship between a multiplier output value (M/K) and a PWM pulse signal.
Figure 4B:

The operation of the AGC will be described with reference to FIGS. 4 and 6. First, a description will be given of the case (FIG. 4A) when the output value (M/K) of the multiplier 126 is larger than 1. The above case corresponds to the case when the mean value (M) of N samples is greater than the sync tip value (K) of the standard signal. Thus, the value (M) must be reduced thereby performing the AGC. For this, the gain of the A/D converter 20 must be reduced by making the TOP voltage larger than a reference TOP voltage. The PWM pulse generator 14, having received a value (M/K) larger than 1 from the multiplier 126, increases the width of high pulses from an initially-set PWM pulse width, and provides the result to the low pass filter 16. The low pass filter 16 integrates the PWM pulse signal having increased pulse width, and inputs a first TOP voltage (shown in FIG. 6), that is higher than the reference TOP voltage, to the A/D converter 20. Since the peak-to-peak value of the input video signal (analog signal) is fixed, then if the TOP voltage initially set in the A/D converter 20 increases to the first TOP voltage, the level of data converted by the A/D converter 20 decrease from the level when the reference TOP voltage is used. Consequently, the gain of the A/D converter 20 decreases, and finally automatic-gain-controlled digital data is output by the A/D converter 20.

Next, a description will be given of the case (FIG. 4B) when the output value (M/K) of the multiplier is smaller than 1. This occurs when the mean value (M) of N samples is smaller than the sync tip value (K) of the standard signal. Thus, the value (M) must be increased, thereby performing the AGC. This is performed in the same way as when M/K>1, but by making change in the opposite direction. For this, the gain of the A/D converter 20 must be increased by making the TOP voltage smaller than the reference TOP voltage. The PWM pulse generator 14, having received a value (M/K) smaller than 1 from the multiplier 126, increases the width of the low pulses, and provides the result to the low pass filter 16. The low pass filter 16 integrates the PWM pulse signal having increased low pulse width, and provides a second TOP voltage (shown in FIG. 6) lower than the reference TOP voltage to the A/D converter 20. Then, when the TOP voltage initially set by the A/D converter 20 decreases to the second TOP voltage, the level of data converted by the A/D converter 20 increases from the level when the reference TOP voltage is used. Consequently, the gain of the A/D converter 20 increases, and finally automatic-gain-controlled digital data is output by the A/D converter 20.

When the output value (M/K) of the multiplier 126 is 1, since the pulse width of a PWM pulse signal initially-set by the PWM pulse generator 14 is maintained, the TOP voltage input to the A/D converter 20 remains the same as the initially-set reference TOP voltage. The AGC is performed by continuously performing the above processes.

The present invention is not limited to the above embodiment, and it is apparent that variations within the spirit of the present invention may be effected by those skilled in the art. That is, in the embodiment of the present invention, the 8-bit analog-to-digital conversion is used only as an example. The present invention is applicable to the general case of an n-bit A/D conversion, such as 10-bit, 12-bit, 18-bit, 20-bit, etc. Also, the present invention can be applied not only to the NTSC broadcasting method but also to other broadcasting methods such as PAL, SECAM, etc.

According to the present invention, all circuits but the low pass filter are digital circuits, so that a special analog AGC IC is not needed. AGC is performed by controlling the TOP voltage of the A/D converter, thereby accomplishing an accurate AGC.

What is claimed is:

1. A digital automatic gain control (AGC) circuit comprising:

an A/D converter for converting a video signal clamped to a reference level into digital output data having a voltage between a predetermined reference voltage provided to said A/D converter and a TOP voltage provided to said A/D converter;

an AGC gate pulse generator for generating an AGC gate pulse for detecting a pedestal level region of said video signal, based on vertical and horizontal synchronous signals; and a TOP voltage controller disposed between said A/D converter and said AGC pulse generator for controlling the TOP voltage of said A/D converter based on a sample value extracted from said digital output data of said A/D converter in accordance with said AGC gate pulse, and a sync tip value of a standard video signal.

2. The digital AGC circuit as claimed in claim 1, wherein said TOP voltage controller comprises:

an AGC comparator for generating a comparison output by comparing a mean value (M) of N samples extracted from said digital output data generated by said A/D converter with said sync tip value (K) of said standard video signal, while said AGC gate pulse is enabled;

a pulse width modulation (PWM) pulse generator for generating a PWM pulse signal corresponding to the comparison output generated by said AGC comparator; and a low pass filter for integrating said PWM pulse signal generated by said PWM pulse generator and transforming the result into a direct current voltage to be used as the TOP voltage provided to said A/D converter.

3. The digital AGC circuit as claimed in claim 2, wherein said AGC comparator comprises:

a sample median value unit for calculating said mean value (M) of N samples extracted from the output of said A/D converter, while said AGC gate pulse is enabled;

a 1/K value setting unit for obtaining a sync tip value (K) of a standard signal and outputting the reciprocal value (1/K) of said sync tip value (K); and a multiplier for multiplying said mean value (M) output by said sample mean value unit by said value (1/K) set by said 1/K value setting unit and providing the product (M/K) to said PWM pulse generator.

4. The digital AGC circuit as claimed in claim 3, wherein said sample mean value unit calculates the mean value (M) of N samples extracted from the output of said A/D converter during a period in which one AGC gate pulse is enabled.

5. The digital AGC circuit as claimed in claim 3, wherein said sample mean value unit calculates the mean value (M) of N samples which are obtained over a period of N AGC gate pulses by extracting one sample during each AGC gate pulse.

6. The digital AGC circuit as claimed in claim 2, wherein said AGC comparator comprises:

a sample mean value unit for generating said mean value (M) of N samples extracted from the digital output data generated by said A/D converter, while said AGC gate pulse is enabled; and a comparator for determining the difference between said mean value (M) generated by said sample mean value unit and said sync tip value (K) of said standard video signal.

7. The digital AGC circuit as claimed in claim 6, wherein said sample mean value unit calculates the mean value (M) of N samples extracted from the digital output data generated by said A/D converter during a period in which one AGC gate pulse is enabled.

8. The digital AGC circuit as claimed in claim 6, wherein said sample mean value unit calculates the mean value (M) of N samples which are gathered over a period of N AGC gate pulses by extracting one sample during each AGC gate pulse.

* * * * *